United States Patent
Skirha, III et al.

(10) Patent No.: US 7,807,084 B2
(45) Date of Patent: Oct. 5, 2010

(54) IN-MOLD DUAL SHOT MASKING

(75) Inventors: Dirk-Martin Skirha, III, Seymour, IN (US); Kevin P. Morris, Columbus, IN (US); Sanders R. Brott, Seymour, IN (US)

(73) Assignee: Osram Sylvania Inc., Danvers, MA (US)

( * ) Notice: Subject to any disclaimer, the term of this patent is extended or adjusted under 35 U.S.C. 154(b) by 1746 days.

(21) Appl. No.: 10/941,438

(22) Filed: Sep. 15, 2004

(65) Prior Publication Data

US 2006/0055079 A1    Mar. 16, 2006

(51) Int. Cl.
B29C 45/14    (2006.01)

(52) U.S. Cl. .............. 264/255; 264/259; 264/328.8

(58) Field of Classification Search .............. None
See application file for complete search history.

(56) References Cited

U.S. PATENT DOCUMENTS 4,701,288 A * 10/1987 Cook et al. ............ 264/1.38
6,460,880 B1 * 10/2002 Gallagher et al. .......... 280/732
6,749,788 B1    6/2004 Holden et al.

* cited by examiner

Primary Examiner—Monica A Huson
(74) Attorney, Agent, or Firm—William H. McNeill

(57) ABSTRACT

A method of selectively applying a pattern to a molded part comprises the steps of forming a mold (8); molding a three-dimensional object (10) having at least one face (12) in the mold, the three-dimensional object (10) being formed of a first material. Masking the at least the one face (12) of the three-dimensional object (10) with a mask (14) comprising a reverse image of a desired pattern while the three-dimensional object is still in the mold. Overmolding the three-dimensional object (10) with a second material to provide the reverse image. Removing the three-dimensional object (10) from the mold, coating at least the one face 12 of the three-dimensional object with a third material; and removing the second material to reveal the desired image.

6 Claims, 2 Drawing Sheets

IN-MOLD DUAL SHOT MASKING

TECHNICAL FIELD

This invention relates generally to pattern forming and more particularly to a method of forming a pattern on an object.

BACKGROUND ART

When forming patterns such as metallized figures on previously molded plastic objects it is the general practice to mold the object, remove it from the mold, create a mask having a reverse image of a desired pattern, fix the mask to the object and then coat the pattern, usually with a metal. The critical part of the prior art process is the mask. Additional time is required when a product needs a specific mask and after being made, the mask requires a great deal of maintenance such as cleaning, repair, fit adjustments, etc.

It would be an advance in the art if a method could be provided that improved the patterning art.

DISCLOSURE OF INVENTION

It is, therefore, an object of the invention to obviate the disadvantages of the prior art.

It is another object of the invention to enhance the preparation of patterned objects.

These objects are accomplished, in one aspect of the invention, by a method of selectively applying a pattern to a molded part that comprises the steps of forming a mold; molding a three-dimensional object having at least one face in the mold, the three-dimensional object being formed of a first material; masking the at least one face of the three-dimensional object to expose a reverse image of a desired pattern while the three-dimensional object is still in the mold; overmolding the three-dimensional object with a second material to provide the reverse image; removing the three-dimensional object from the mold; coating at least the one face of the three-dimensional object with a third material; and removing the second material to reveal the desired image.

This process eliminates the previously required cleaning, repairing and fit adjustments for the mask. Further, eliminating the need for accurately positioning the mask reduces cycle times.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
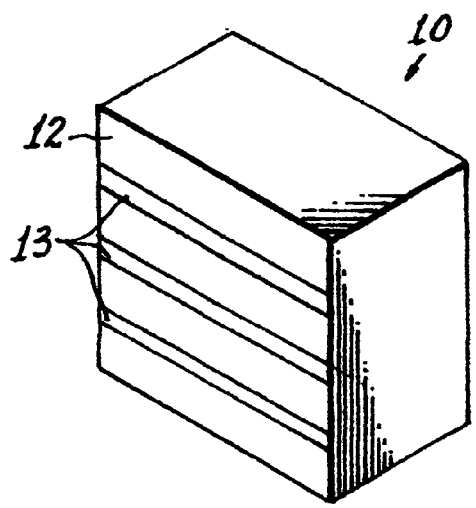
FIG. 1 is a diagrammatic, perspective view of a three-dimensional object having a pattern on one face.

Referring now to the drawings with greater particularity, there is shown in FIG. 1 a three-dimensional object 10 having at least one face 12 upon which it is desired to form a pattern. In the example of FIG. 1 the pattern comprises a plurality of lines 13, preferably of metal, it being understood that other materials such as plastic and other patterns or designs can be employed.

Figure 2:
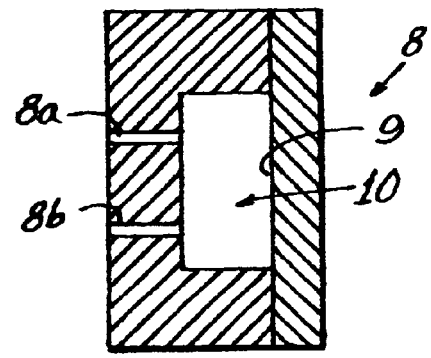
FIG. 2 is a diagrammatic sectional view of a mold.
Figure 3:
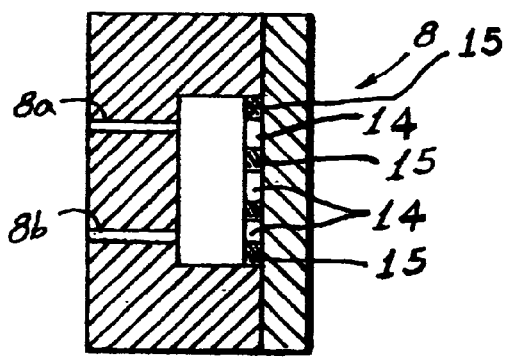
FIG. 3 is a diagrammatic sectional view of the mold with a mask in place.
Figure 4:
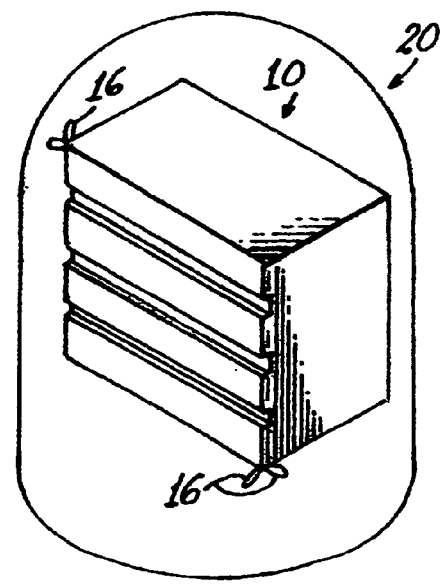
FIG. 4 is a diagrammatic, perspective view of an object with a second material in place.

A mold 8 is provided having the usual cavity 9 for forming the object 10. Two gates, 8a and 8b, can be provided, gate 8a being used to infuse a first material and gate 8b being used to infuse a second material. The materials should be selected so that they do not have a strong affinity to permanently adhere to one another. For example, in a preferred embodiment of the invention, the first material can be a polycarbonate and the second material can be Santoprene™. Santoprene, which is a registered trademark of Exxon Mobil Corporation, is a thermoplastic elastomer formed by the in-situ cross linking of EPDM (ethylene propylene diene monomer) rubber and polypropylene. The latter material (i.e., the Santoprene) has an additional advantage in that it is recyclable. Alternatively, the second material can be an elastomeric material of a rigid plastic FIG. 2 illustrates an object 10 in the mold 8 after having been formed from the first material and FIG. 3 illustrates the object 10 in the mold 8 with a mask 14 in position on the face 12. With the mask in position the second material is cast about the previously formed object 10, filling in at least the reverse image designated by the areas 15. Over molding a second material over a first material is known in the art; however, such art requires as close to a permanent bond between the materials as it is possible to achieve.

With the object 10 overcoated with the second material it is removed from the mold 8 and placed in a coating receptacle 20 and a third material is applied over the second coating.

The third material can be any material that can be applied as a fluid, such as a liquid, for example, a polymer paint, or a vapor, gas or plasma.

Figure 5:
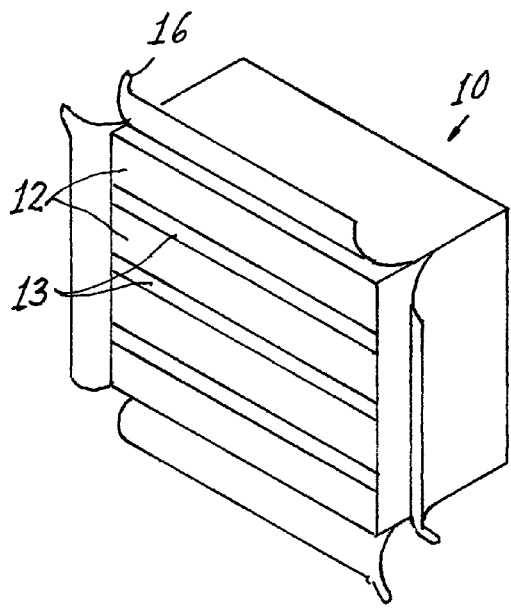
FIG. 5 is a diagrammatic, perspective view of an object with the second material being removed.
Figure 7:
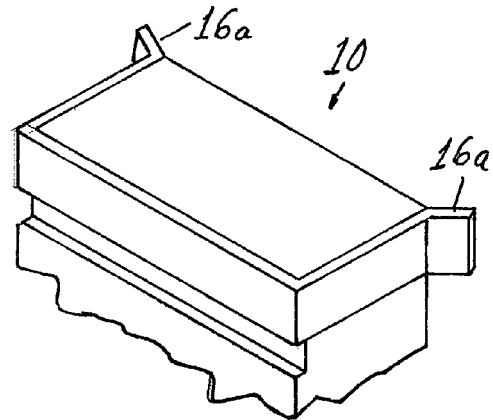
FIG. 7 is a diagrammatic, perspective view of an alternate embodiment.
Figure 6:
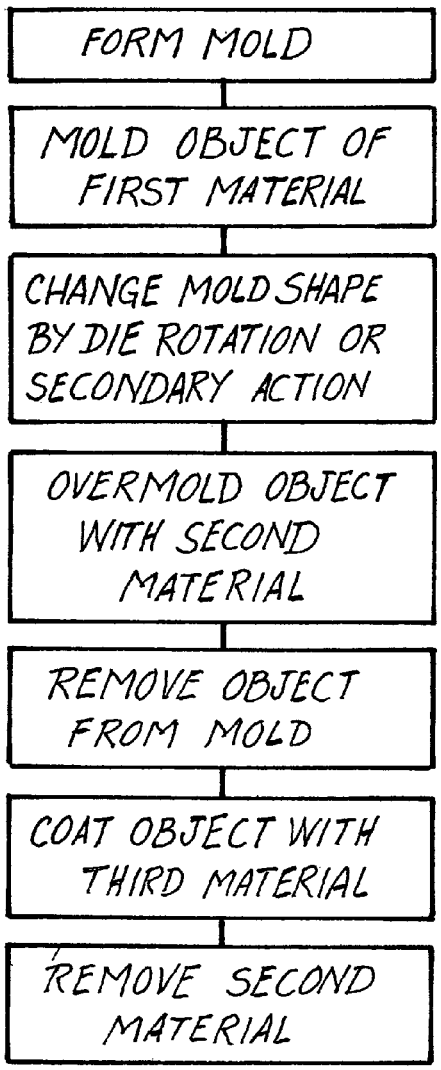
FIG. 6 is a flow diagram of the method of the invention.

In a preferred embodiment the second material can be provided with at least one pull-tab 16 to be used in removing the second material, as is shown in FIG. 5. Removing the second material leaves the desired pattern on the face 12, as is shown in FIG. 1.

Alternatively, when the second material is a rigid plastic, pull-tabs 16a can be provided which can be broken off or sprung to release the mask.

There is thus provided a method for forming patterns that eliminates the problems associated with the prior art.

While there have been shown and described what are present considered to be the preferred embodiments of the invention, it will be apparent to those skilled in the art that various changes and modifications can be made herein without departing from the scope of the invention as defined by the appended claims.

What is claimed is:

1. A method of selectively applying a pattern to a molded part comprising the steps of:
    forming a mold;
    molding a three-dimensional object having at least one face in said mold, said three-dimensional object being formed of a first material;
    masking said at least one face of said three-dimensional object with a reverse image of a desired pattern while said three-dimensional object is still in said mold;

overmolding said three-dimensional object with a second material to provide said reverse image;

removing said three-dimensional object from said mold;

coating at least said one face of said three-dimensional object with a third material; and removing said second material to reveal said desired image.

2. The method of claim 1 wherein said first material is plastic.

3. The method of claim 2 wherein said second material is selected from the group consisting of rubber and elastomers.

4. The method of claim 3 wherein said third material is selected from the group consisting of metal and polymers.

5. The method of claim 4 wherein said second material includes a graspable pull-tab.

6. The method of claim of claim 2 wherein said second material is a rigid plastic.

* * * * *